United States Patent
Bernard et al.

[11] Patent Number: 6,149,088
[45] Date of Patent: Nov. 21, 2000

[54] FISHING REEL WITH TANGLE FREE SYSTEM

[76] Inventors: Jean Bernard, 134 avenue des Lacs, 74950 Scionzier; Alain Plestan, 131 Impasse des Merises, 74970 Marignier, both of France

[21] Appl. No.: 09/128,379

[22] Filed: Aug. 3, 1998

[51] Int. Cl.[7] .................................................. A01K 89/01
[52] U.S. Cl. ............................................................. 242/231
[58] Field of Search .................................. 242/231, 232, 242/233, 238, 239, 240, 322

[56] References Cited

U.S. PATENT DOCUMENTS

| | | |
|---|---|---|
| 2,728,534 | 12/1955 | Wallace . |
| 2,771,253 | 11/1956 | Mauborgne . |
| 3,834,644 | 9/1974 | Stackawicz . |
| 4,448,367 | 5/1984 | Puryear ................................... 242/239 |
| 4,451,012 | 5/1984 | Puryear et al. .......................... 242/322 |
| 5,213,279 | 5/1993 | Puryear ................................... 242/239 |
| 5,312,067 | 5/1994 | Sugawara et al. . |
| 5,388,776 | 2/1995 | Childre .................................... 242/239 |
| 5,513,813 | 5/1996 | Bernard et al. . |

FOREIGN PATENT DOCUMENTS

| | | |
|---|---|---|
| 1936833 | 6/1970 | Germany . |
| WO85/02974 | 7/1985 | WIPO . |

*Primary Examiner*—Katherine A. Matecki
*Attorney, Agent, or Firm*—Foley & Lardner

[57] ABSTRACT

A fishing reel includes a line retaining surface configured to have fishing line wrapped thereabout and a line retrieval surface proximate the line retaining surface. The line retrieval surface moves between a first position in which the line retrieval surface permits fishing line to unwind from the line retaining surface and a second position in which the line retrieval surface engages and guides fishing line onto and about the line retaining surface. The fishing reel further includes a plurality of bristles extending adjacent to the line retrieval surface when the line retrieval surface is in the second position.

29 Claims, 5 Drawing Sheets

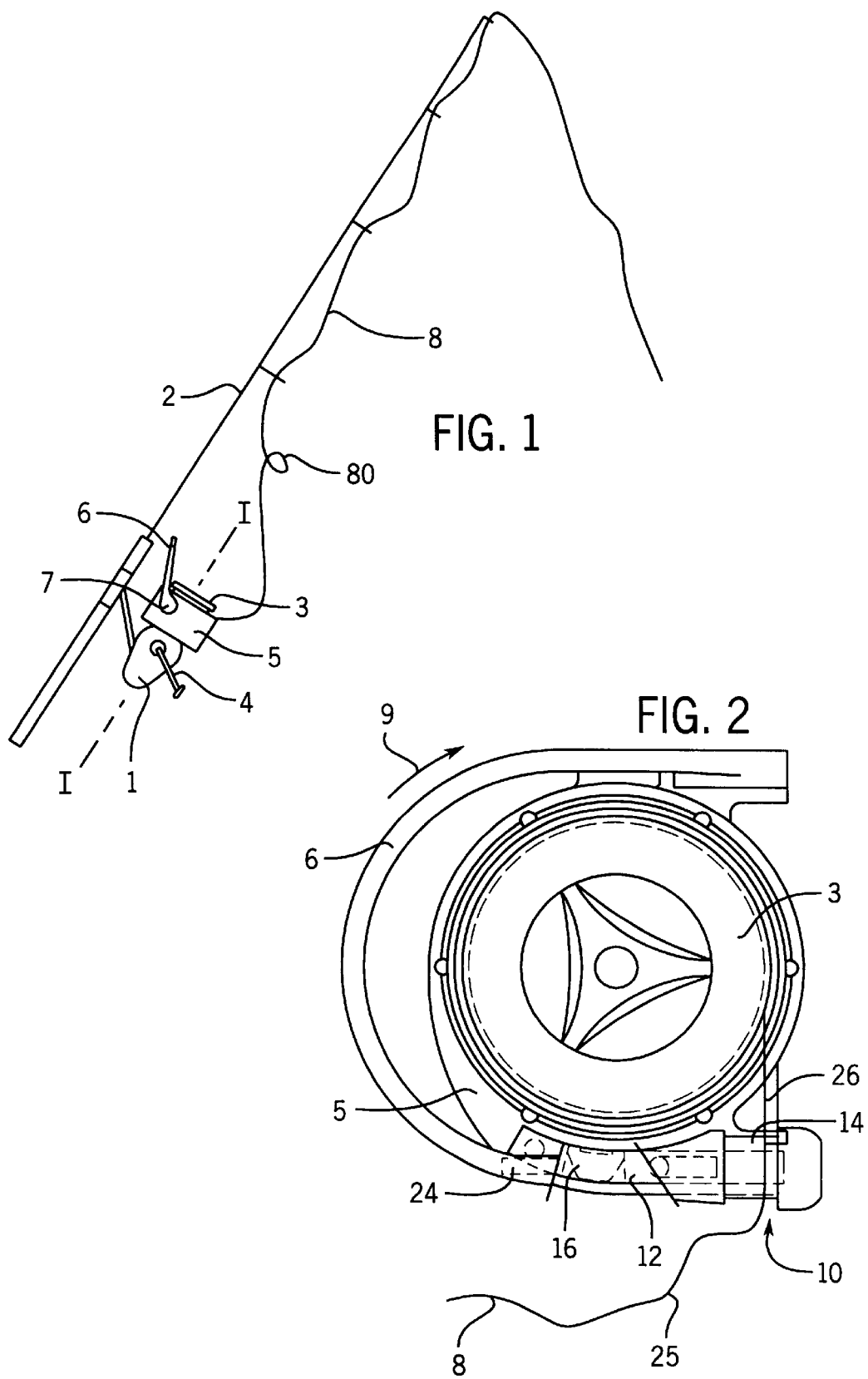

FISHING REEL WITH TANGLE FREE SYSTEM

FIELD OF THE INVENTION

This invention pertains to fishing reels with a fixed spool and a rotary line pick up, in which a rotary drum supports a bail arm and is engaged in axial rotation by means of a crank handle. The bail arm is retractable and is articulated on the drum to swivel between a retracted position that frees the fishing line and has it unwind from the spool, and a retrieval position that envelops the spool to pick up and guide the line and wind it on the spool when the drum rotates.

BACKGROUND OF THE INVENTION

When rod and reel fishing, the line is initially wound on the spool. The fisherman swivels the bail arm to bring it into a retracted position, and casts the line that rapidly unwinds from the spool. After casting, the line has some slack. To retrieve the line the fisherman turns the crank handle that drives the rotary drum in axial rotation. On standard reels this rotation causes the bail arm to swivel automatically and to come into a retrieval position to guide the line and to wind it onto the spool. At the beginning of the retrieval, the line generally goes on an intermediate section of the bail arm, and gradually goes around a first end of the bail arm.

We have noticed some winding flaws with this type of fishing reel caused by winding the line on the spool during its retrieval. In fact, when the line has plenty of slack, at the beginning of the retrieval, for example, part of the line located between the spool and the bail arm also has some slack, so that the first turns on the spool are often very loose and cause an irregular winding. Such irregularities in the winding may also happen while retrieving the line, during tension variations of the fishing line that may be found completely slack at some steps during retrieval.

These irregularities result mainly from the fact that, at a slackened state, the line has the tendency to again find the same shape that it had when it was wound around the reel spool before casting. There is a risk that some loops may appear on the line upstream of the reel as a result, and these loops may wind irregularly onto the spool during retrieval.

These irregularities in the winding subsequently disturb the casting operation, since they help unwind several turns of the spool at the same time and often cause tangling of the line (generally called "tangles").

Document FR 2 710 238 A describes part of a solution to this problem. According to part of a solution, we provide nip surfaces on the bail arm and the drum respectively, shaped to rest one against the other when the bail arm is in a retrieval position. While the drum is in rotation during retrieval, the line goes between the nip surfaces and is pinched and therefore becomes tight between the spool and the bail arm.

This solution is relatively effective at the beginning of the retrieval operation, that is before the line reaches the line guide roller. On the other hand, its effectiveness is not as good when the line happens to be completely loose during some subsequent steps while retrieving, and we have noticed that some loops on the line are not undone by this device.

SUMMARY OF THE INVENTION

With this invention we suggest designing a new structure for the fishing reel, one that would ensure a more reliable regular winding of the fishing line onto the spool, at the beginning and during the entire retrieval operation, even when the line happens to be momentarily slackened.

According to the invention, we provide the means for ensuring an efficient elimination of the loops on the fishing line during the retrieval operation, and we try to tighten evenly and constantly a part of the line that winds around the spool, this tension being ensured whatever the diameter of the fishing line.

A fishing reel includes a line retaining surface configured to have fishing line wrapped thereabout and a line retrieval surface proximate the line retaining surface. The line retrieval surface moves between a first position in which the line retrieval surface permits fishing line to unwind from the line retaining surface and a second position in which the line retrieval surface engages and guides fishing line onto and about the line retaining surface. The fishing reel further includes a plurality of bristles extending adjacent to the line retrieval surface when the line retrieval surface is in the second position.

The invention further, invention suggests a fishing reel with a fixed spool and a rotary line pick up, in which a rotary drum supports a bail arm and is engaged in axial rotation by means of a crank handle. The bail arm is retractable, and is articulated on the drum to swivel between a retracted position that frees the fishing line so that it can unwind from the spool, and a retrieval position that envelops the spool to pick up and guide the line and wind it on the spool when the drum rotates, the bail arm comprises a line guide roller on its first end; according to the invention, facing the line guide roller, the drum comprises some bristles directed toward the line guide roller and the ends of which come near or into contact with the line guide roller.

One added advantage with this design for a reel is that it cleans the line during its retrieval, retaining more particularly the algae that may get caught on the line.

According to a preferred method of implementation, the bristles are spread out in several staggered rows oriented along the line guide roller.

Preferably, the bristles have dimensions such that their respective ends follow the longitudinal and peripheral curves of the line guide roller.

According to a first method of implementation, the bristles are made of plastic and cast in one piece with a support added on the drum.

According to a second method of implementation, the bristles are fixed to a support added on the drum.

Preferably, the support is removable coupled to the drum. This way, the support is interchangeable and can be taken apart, either for repair or for cleaning, and we can have different adjustable supports, with different bristles, that the user may choose according to the line diameter or the type of fishing.

Other objectives, characteristics and advantages of this invention will be elaborated in the following description for the specific methods of implementation by referring to the appended figures:

BRIEF DESCRIPTION OF THE DRAWINGS

FIG. 1 is a side view that illustrates a fishing rod and a fishing reel, with a slackened fishing line such as may appear at the end of the casting operation.

FIG. 2 is a cross section of the reel according to the invention, in the line pick up position.

DETAILED DESCRIPTION OF THE PREFERRED EMBODIMENTS

Figure 3:
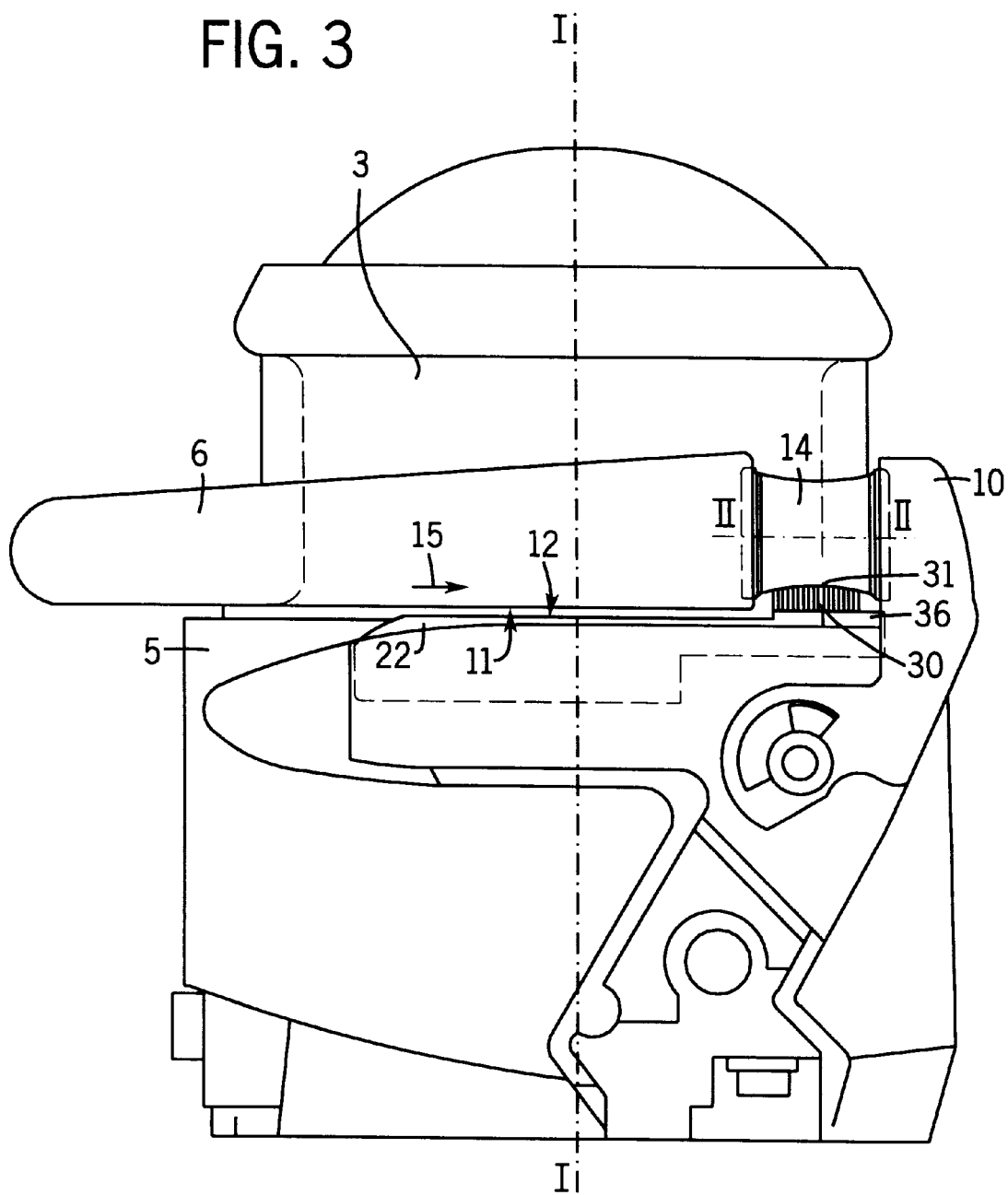
FIG. 3 is a partial side view of the reel according to a first method of implementation, in the line retrieval position.

As is illustrated in FIG. 1, the fishing reels that are usually used for rod and reel fishing comprise a reel body (1) with the means of fastening on a fishing rod (2). The reel body (1) comprises a spool (3), the symmetrical longitudinal axis I—I of which is roughly parallel with the direction of the fishing rod (2). The means for line retrieval include a crank handle (4) operated by the user, for the purpose of turning the drum (5) in axial rotation according to the axis I—I of the spool (3) through a gear mechanism inside the reel body (1). The drum (5) supports a retractable bail arm (6), the bail arm (6) being articulated on the drum (5) according to a transverse rotation axis (7) to swivel between a retracted position, as represented in FIG. 1, that frees the fishing line (8) and has it unwind from the spool (3), and a retrieval position represented in FIGS. 2 through 4 in which the bail arm (6) envelopes the spool (3) to pick up and guide the line (8) and to wind it on the spool (3) while the drum (5) is in rotation.

In FIG. 1 we notice that the line (8) is slackened at the end of the casting operation and may create loops such as the loop (80).

As represented in FIG. 2, during the retrieval operation the fact that the crank handle (4) (FIG. 1) is turned causes the drum (5) to rotate around the spool (3) in the direction represented by an arrow (9). As a result, the fishing line (8) gradually goes around a first end (10) of the bail arm (6), or the end that is in the rear in the direction of rotation (9) of the drum (5).

Figure 4:
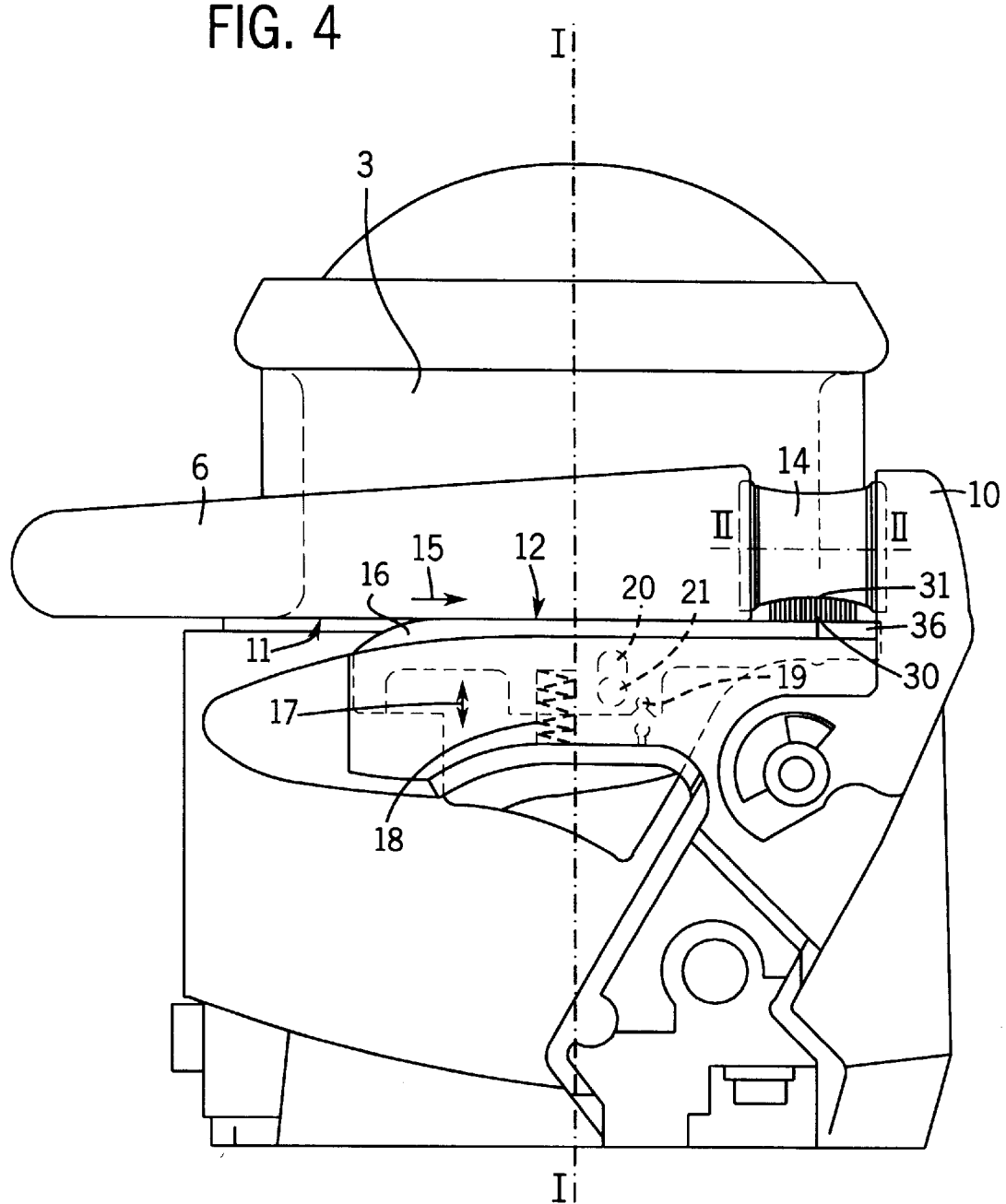
FIG. 4 is a partial side view of the reel according to a second method of implementation, in the line retrieval position.

As illustrated in FIGS. 2, 3 and 4, near the first end (10) of the bail arm (6), the bail arm (6) and the drum (5) have nip surfaces (11 & 12). The nip surfaces (11 & 12) are shaped to rest one against the other when the bail arm (6) is in a retrieval position.

As represented in FIGS. 2 through 4, the bail arm (6) preferably comprises a line guide roller (14) on its first end (10) for guiding the line (8). The line guide roller (14) is adjacent to the corresponding nip surface (11) of the bail arm (6), and faces part of the end of the corresponding nip surface (12) of the drum (5). In this way, when tension appears on the downstream section of the line downstream of the bail arm, the line (8) has the tendency to slide laterally between the nip surfaces (11 & 12), as illustrated by the arrow (15) in FIGS. 3 and 4, to get between the line guide roller (14) and the drum (5). The line guide roller (14) is mounted so as to rotate according to an axis II—II, represented in FIGS. 3 and 4, that is roughly perpendicular to the axis I—I of the spool.

Preferably, when the bail arm (6) is in the retrieval position, the respective nip surfaces (11 & 12) face each other for a significant length, for example a length that is between one tenth of and the entire length of the bail arm (6). The method of implementation illustrated by the figures, which provides good results, comprises nip surfaces (11 & 12) with a length that is between one third and one quarter of the length of the bail arm (6).

Also, when the bail arm (6) is in a retrieval position, the respective nip surfaces (11 & 12) may be inclined slightly with respect to each other and get progressively closer in an angle with the first end (10) of the bail arm (6). This facilitates the progressive engagement of the line at the beginning of retrieval.

Figure 5:
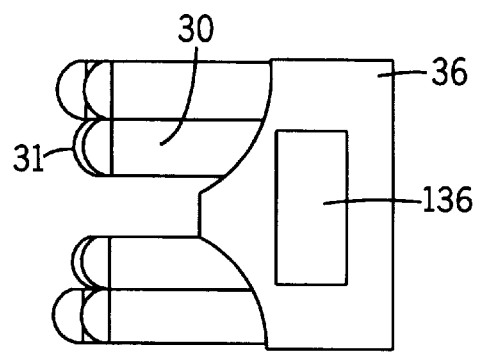
FIG. 5 is an end view of an adjustable support on the drum of a reel that comprises bristles, according to a method of implementation for this invention.
Figure 6:
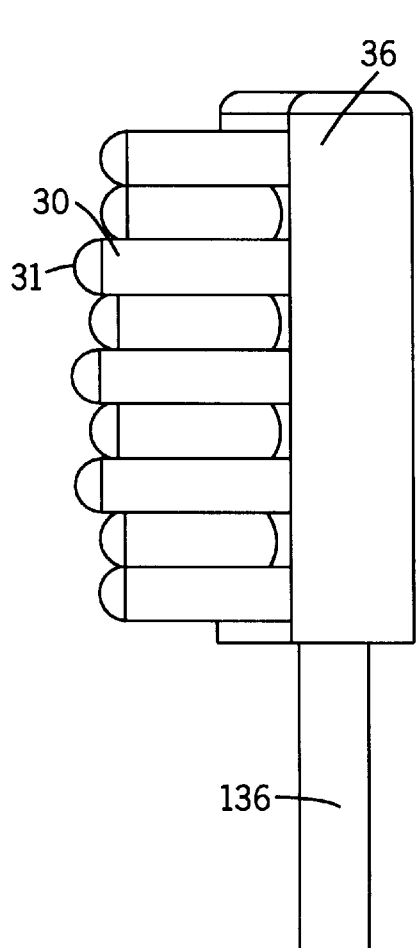
FIG. 6 is a side view of the support with bristles from FIG. 5.

According to the invention, facing the line guide roller (14), the drum (5) comprises bristles (30) directed toward the line guide roller (14) and the ends (31) of which come near to or into contact with the line guide roller (14). As we can notice in FIGS. 3 and 4, the bristles (30) have dimensions such that their respective ends (31) follow the longitudinal and peripheral curves of the line guide roller (14). Similarly, as we can see in the end view in FIG. 5, the respective ends (31) of the bristles (30) are spread out approximately in a circular profile to follow the peripheral curves of the line guide roller (14).

The bristles are individual flexible stems fixed at their base, with a small transverse section.

Figure 7:
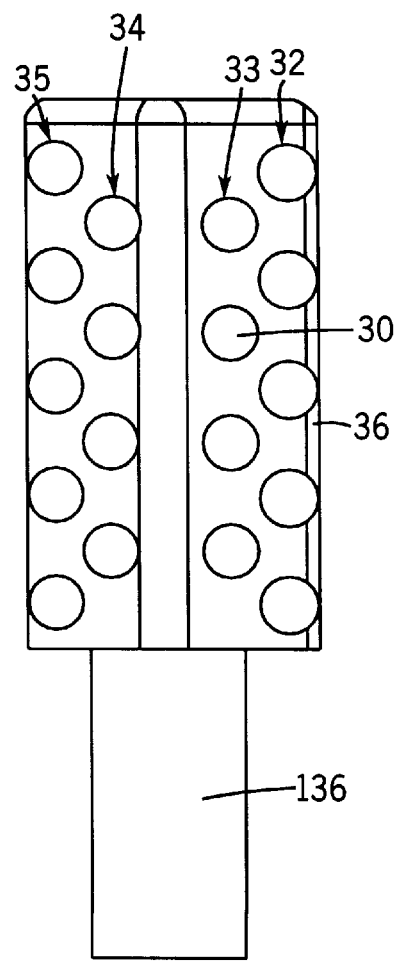
FIG. 7 is a front view of the support with bristles from FIG. 5.

Preferably, as illustrated in the front view of FIG. 7, the bristles (30) are spread out in several rows such as rows 32, 33, 34, and 35, oriented along the line guide roller (14) (FIG. 3 and 4), parallel with its longitudinal axis II—II, and are arranged in staggered rows, the bristles from one row being shifted with respect to the bristles from the adjacent row.

In the method of implementation illustrated in the figures, particularly in FIGS. 5 through 8, the bristles (30) are fixed to a support (36) that is itself added to the drum (5). The support (36) is removably coupled to the drum (5), to allow for interchange and/or disassembly for repair or for cleaning. For example, the support (36) may include a handle (136) that can be forced into a corresponding hole of the drum (5) or an intermediate part fixed to the drum (5).

The bristles (30) may be cast in one piece with the support (36), or fixed to the support (36), in the manner in which brushes are usually made.

In the simplified method of implementation illustrated in FIG. 3 the support (36) is fixed to a fixed plate (22), mounted on the drum (5), and the front surface forms the nip surface (12) of the drum (5).

Figure 8:
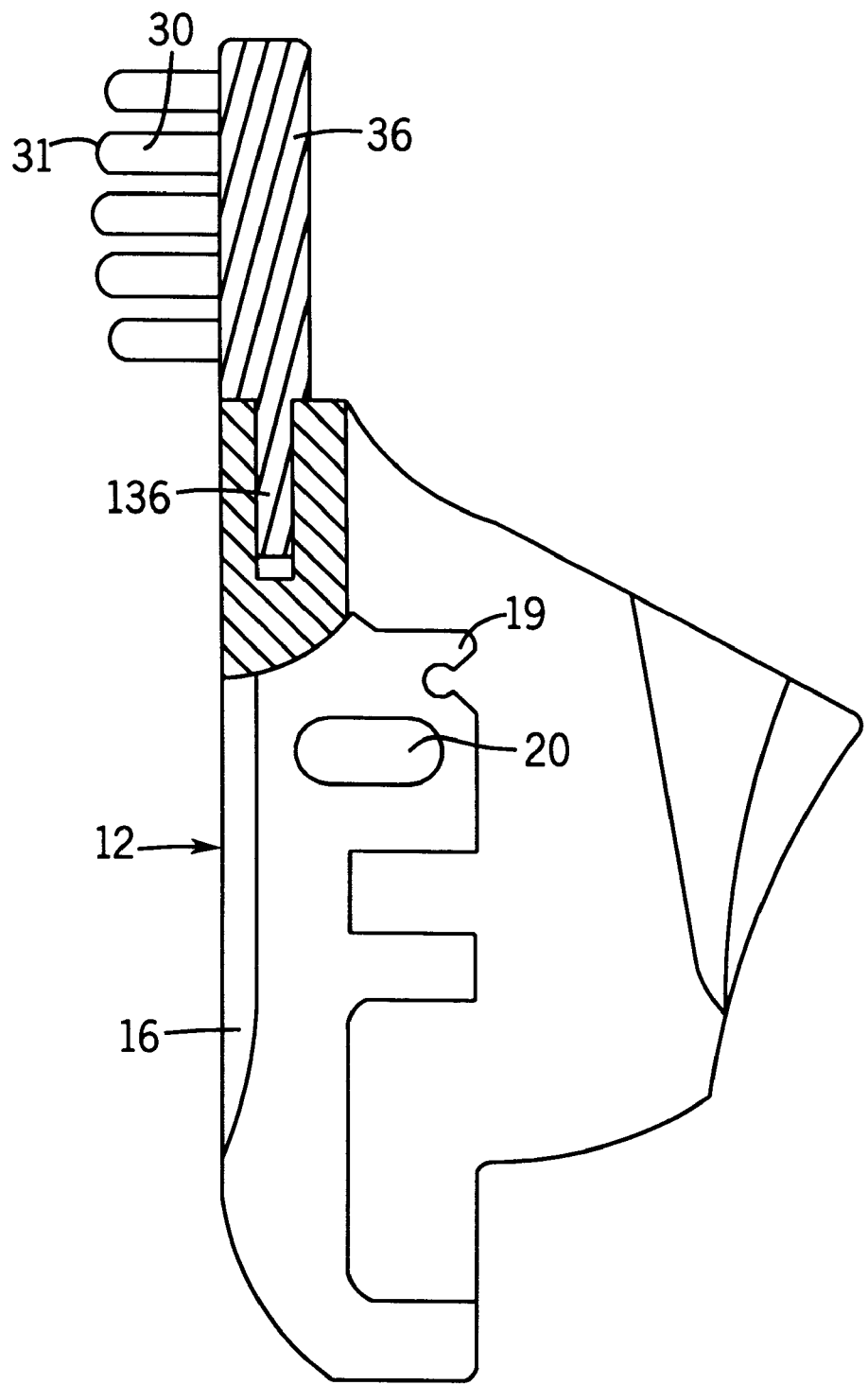
FIG. 8 is a side view of a slide plate holding the support with bristles from FIGS. 5 through 7, according to a method of implementation.

In the method of implementation illustrated in FIGS. 4 and 8, the support (36) is mounted on a slide plate (16), the front surface of which forms the nip surface (12) of the drum (5). In this method of implementation the slide plate (16) is mounted on the drum (5) with a front- to -rear freedom of movement illustrated by the double arrow (17). The slide plate (16) is engaged by flexible means (18) such as a helical spring, pushing it back toward the front in the direction of the bail arm (6). Preferably, the slide plate (16) has an intermediate oblong opening (20), where a pin (21) of the drum (5) goes through to permit front-rear freedom of movement (17) of the slide plate (16). The spring pushes away the slide plate (16) toward the front by means of a support that is off-center from the intermediate oblong opening (20) at an area that is opposite to the area with the bristles (30), that is in the opposite direction of the support (36).

Therefore, in both methods of implementation in FIGS. 3 and 4 the drum (5) comprises a nip surface (12) that is adjacent to the area with the bristles (30), and is designed to come near to or into contact with the bail arm (6) in the retrieval position and therefore to pinch the line at the beginning of the retrieval operation.

In particular, FIG. 4 illustrates the slide plate (16) in the pinching position, resting against the bail arm (6). Part of the slide plate (16) may move back, the plate being pushed back by the line engaged between the bail arm (6) and the plate (16).

The slide plate (16) may preferably be retractable. For this, it is combined with locking means (19) to keep it at the rear, away from the bail arm (6) in order to selectively suppress the nip function of the line (8). An example of a means of locking (19) is drawn in FIG. 4.

In the methods of implementation illustrated in FIGS. 3 and 4 the nip surface (12) of the drum (5) is formed by the front surface of the drum (5) itself. This method of implementation is applied for reels that have an enveloping drum, the type of reels where the drum (5) partially covers the spool (3).

In the methods of implementation with an enveloping spool, it is possible to have an auxiliary bail arm mounted and fixed to the drum (5) in front of its front edge and generally parallel to the bail arm (6). The nip surface (12) is then formed by the front surface of this auxiliary bail arm, and the auxiliary bail arm may then carry the support with bristles.

The design of the reel according to the invention is compatible with the making of a bail arm (6) of composite material. Here, to prevent wear of the composite material caused by friction of the line (8) while it is pinched, we can preferably have an anti wear metal part (24).

Although the methods of implementation illustrated in the figures have nip surfaces (11 & 12), we will notice that the invention is not limited to only these methods of implementation, but that a design of a drum (5) with bristles (30) may be used effectively without a nip, that is on a fishing reel where the respective surfaces (11 & 12) of the bail arm (6) and the drum (5) stay apart one from the other. The disentangling effect happens when the line (8) reaches the area occupied by the bristles (30).

FIG. 2 illustrates the effect of the means of disentangling according to the invention; at the beginning of retrieval an intermediate part of the fishing line (8) goes between the nip surfaces (11 & 12). The downstream section (25) of the fishing line (8), or the section located downstream of the bail arm, may be found slackened with possible loops, while the upstream section (26) of the fishing line located between the bail arm (6) and the spool (3) is found tightened according to a force of tension determined by the force by which the line is pinched between the nip surfaces (11 & 12), and has no loops. Then the fishing line (8) slides toward the line guide roller (14), and goes through the bristles (30) to become effectively untangled.

This invention is not limited to the methods of implementation that have been explicitly described, but it includes the diverse variants and generalizations contained in the following claims.

What is claimed is:

1. A fishing reel comprising:
   a line retaining surface configured to have fishing line wrapped thereabout;
   a line retrieval surface proximate to the line retaining surface, wherein the line retrieval surface moves between a first position in which the line retrieval surface permits fishing line to unwind from the line retaining surface and a second position in which the line retrieval surface engages and guides fishing line as fishing line is wound about the line retaining surface;
   a structure opposite the line retrieval surface when the line retrieval surface is in the second position;
   a plurality of bristles supported by the structure and extending from the structure towards the line retrieval surface when the line retrieval surface is in the second position, whereby the bristles and the line retrieval surface sandwich tensioned line therebetween during line retrieval, whereby the bristles untangle line during line retrieval.

2. The fishing reel of claim 1, wherein the line retrieval surface is rotatable about the line retaining surface when the line retrieval surface is in the second position.

3. The fishing reel of claim 1, wherein the plurality of bristles have axial ends extending adjacent to the line retrieval surface when the line retrieval surface is in the second position.

4. The fishing reel of claim 1, wherein the support is removably coupled to the fishing reel.

5. The fishing reel of claim 1, wherein the line retaining surface comprises a spool.

6. The fishing reel of claim 1, including a bail arm rotatably supported about the line retaining surface, wherein the bail arm includes the line retrieval surface.

7. The fishing reel of claim 6, wherein the bail arm swivels between a retracted position at which the line retrieval surface is in the first position and a retrieval position in which the line retrieval surface is in the second position.

8. The fishing reel of claim 6, wherein the bail arm includes a line guide roller including the line retrieval surface.

9. The fishing reel of claim 8, wherein the bristles have axial ends adjacent the line guide roller.

10. The fishing reel of claim 9, wherein the plurality of bristles extend in a plurality of staggered rows oriented along the line guide roller.

11. The fishing reel of claim 9, wherein the line retrieval surface is concave and wherein the axial ends of the plurality of bristles collectively terminate along a convex plane.

12. The fishing reel of claim 6, including a nip surface adjacent the plurality of bristles, wherein the nip surface extends adjacent the bail arm when the bail arm is in the retrieval position to pinch the fishing line against the bail arm.

13. The fishing reel of claim 12, wherein the nip surface is moveable towards and away from the bail arm and wherein the nip surface is resiliently biased towards the bail arm.

14. The fishing reel of claim 12, wherein the nip surface converges with the bail arm towards the plurality of bristles.

15. The fishing reel of claim 1 including a rotary drum adjacent to the line retrieval surface, wherein the structure supporting the plurality of bristles is carried by the drum.

16. A fishing reel comprising:
    a spool adapted to contain fishing line;
    a rotary drum adjacent the spool;
    a bail arm articulated on the drum, wherein the bail arm swivels between a retracted position in which the bail arm permits the fishing line to unwind from the spool and a retrieval position in which the bail arm guides and winds the fishing line onto the spool as the drum is rotated; and
    a plurality of bristles carried by the drum and supported adjacent the bail arm, whereby the bristles untangle line during line retrieval.

17. The fishing reel of claim 16, wherein the plurality of bristles have axial ends adjacent the bail arm.

18. The fishing reel of claim 17, wherein the plurality of bristles extend in a plurality of staggered rows extending along the bail arm.

19. The fishing reel of claim 17, wherein the bail arm has a surface with a contour opposite the axial end of the plurality of bristles and wherein the axial ends of the plurality of bristles follow the contour.

20. The fishing reel of claim 16, wherein the bail arm includes a line guide roller adjacent the plurality of bristles.

21. The fishing reel of claim 16, including a support from which the plurality of bristles extend, wherein the support is removably coupled to the drum.

22. The fishing reel of claim 21, wherein the plurality of bristles are affixed to the support.

23. The fishing reel of claim 21, wherein the plurality of bristles are integrally formed as part of a single unitary piece with the support.

24. The fishing reel of claim 16, wherein the drum includes a nip surface extending adjacent to the plurality of bristles, wherein the nip surface extends adjacent the bail arm when the bail arm is in the retrieval position to pinch fishing line against the bail arm.

25. The fishing reel of claim 24, wherein the nip surface is moveable towards and away from the bail arm and wherein the nip surface is resiliently biased towards the bail arm.

26. The fishing reel of claim 25, including an external side plate removably coupled to the drum, wherein the side plate includes the nip surface and wherein the side plate is pivotally coupled to the drum on one side of the plurality of bristles.

27. A line engaging device for use with a fishing reel having a line retaining surface configured to have fishing line wrapped thereabout and a line retrieval surface proximate the line retaining surface, wherein the line retrieval surface moves between a first position in which the line retrieval device permits line to be unwound from the line retaining surface and a second position in which the line retrieval surface engages the fishing line to guide the fishing line as the fishing line is wound about the line retaining surface, the device comprising:

a support configured to be removably coupled to the fishing reel proximate the line retrieval surface when the line retrieval surface is in the second position; and a plurality of bristles extending from the support and adapted to extend opposite and towards the line retrieval surface when the line retrieval surface is in the second position, whereby the bristles untangle line during line retrieval.

28. The device of claim 27, wherein the plurality of bristles have axial ends configured to extend adjacent to the line retrieval surface when the line retrieval surface is in the second position and when the support is removably coupled to the fishing reel.

29. The device of claim 28, wherein the line retrieval surface has a contour and wherein the axial ends of the bristles are configured to follow the contour when the device is coupled to the fishing reel.

* * * * *